(12) United States Patent
Li et al.

(10) Patent No.: US 11,367,951 B2
(45) Date of Patent: Jun. 21, 2022

(54) MULTI-FREQUENCY ANTENNA TRANSMISSION

(71) Applicant: SHENZHEN ZHAOWEI MACHINERY & ELECTRONICS CO.,LTD., Guangdong (CN)

(72) Inventors: Ping Li, Guangdong (CN); Weiqun Xie, Guangdong (CN); Jiemo Li, Guangdong (CN)

(73) Assignee: SHENZHEN ZHAOWEI MACHINERY & ELECTRONICS CO., LTD., Guangdon (JP)

(*) Notice: Subject to any disclaimer, the term of this patent is extended or adjusted under 35 U.S.C. 154(b) by 853 days.

(21) Appl. No.: 16/311,912

(22) PCT Filed: Mar. 26, 2018

(86) PCT No.: PCT/CN2018/080476
§ 371 (c)(1),
(2) Date: Dec. 20, 2018

(87) PCT Pub. No.: WO2019/109550
PCT Pub. Date: Jun. 13, 2019

(65) Prior Publication Data
US 2020/0227822 A1 Jul. 16, 2020

(30) Foreign Application Priority Data
Dec. 6, 2017 (CN) .......................... 201711275780.0

(51) Int. Cl.
*H01Q 3/02* (2006.01)
*F16H 25/24* (2006.01)
(Continued)

(52) U.S. Cl.
CPC ............... *H01Q 3/02* (2013.01); *F16H 25/24* (2013.01); *F16H 37/14* (2013.01); *H01Q 1/246* (2013.01); *H01Q 3/24* (2013.01)

(58) Field of Classification Search
CPC ............................ H01Q 1/125; H01Q 21/30
See application file for complete search history.

(56) References Cited

U.S. PATENT DOCUMENTS 10,199,725 B2 * 2/2019 Elsaadani ................ H01Q 3/32
10,320,076 B2 * 6/2019 Fang ........................ H01Q 3/32
(Continued)

FOREIGN PATENT DOCUMENTS

| CN | 105514610 | 4/2016 |
| CN | 106252883 | 12/2016 |

(Continued)

OTHER PUBLICATIONS

International Search Report and Written Opinion of PCT/CN2018/080476, dated Jul. 30, 2018, 8 pages (Chinese).

(Continued)

*Primary Examiner* — Ab Salam Alkassim, Jr.
(74) *Attorney, Agent, or Firm* — Rankin, Hill & Clark LLP

(57) ABSTRACT

The multi-frequency antenna transmission, including a drive gear, a gear train with parallel gear shafts, screw assemblies and a shifter. The transmission gears are connected to the stoppers of the screw assemblies one by one, the drive gear drives the various transmission gears to rotate, and all the stoppers rotate. The shifter pushes the stopper of one of the screw assemblies, such that the first elastic member disposed between the connection member and the stopper is compressed, and the connection member is connected to corresponding lead screw, thus the power of the stopper is transmitted to corresponding lead screw through the com- (Continued)

pressed first elastic member and the connection member, and drives the lead screw to rotate.

12 Claims, 4 Drawing Sheets

(51) Int. Cl.
*F16H 37/14* (2006.01)
*H01Q 1/24* (2006.01)
*H01Q 3/24* (2006.01)

(56) References Cited

U.S. PATENT DOCUMENTS

| | | | | |
|---|---|---|---|---|
| 10,581,163 | B2* | 3/2020 | Schmutzler | F16H 25/20 |
| 10,734,712 | B2* | 8/2020 | Duan | H01Q 5/30 |
| 10,989,286 | B2* | 4/2021 | Xie | F16H 25/24 |
| 11,022,217 | B2* | 6/2021 | Fu | F16H 37/12 |
| 2013/0127377 | A1* | 5/2013 | Zhao | H01Q 3/06 318/5 |
| 2016/0352011 | A1* | 12/2016 | Duan | H01Q 3/32 |
| 2017/0365923 | A1* | 12/2017 | Schmutzler | H01Q 3/005 |
| 2017/0373392 | A1* | 12/2017 | Kim | H01Q 3/32 |
| 2019/0331220 | A1* | 10/2019 | Fu | F16H 63/30 |
| 2020/0028245 | A1* | 1/2020 | Duan | H01Q 1/125 |
| 2020/0161758 | A1* | 5/2020 | Schmutzler | H01Q 3/06 |
| 2020/0173526 | A1* | 6/2020 | Xie | H01Q 1/125 |
| 2020/0212565 | A1* | 7/2020 | Li | F16H 1/20 |
| 2020/0220260 | A1* | 7/2020 | Li | H01Q 3/08 |
| 2021/0408679 | A1* | 12/2021 | Wang | H01Q 3/005 |

FOREIGN PATENT DOCUMENTS

| | | | | |
|---|---|---|---|---|
| CN | 206116629 | | 4/2017 | |
| CN | 106641159 | | 5/2017 | |
| CN | 107069221 | A * | 8/2017 | H01Q 3/02 |
| CN | 206516761 | | 9/2017 | |
| CN | 206708328 | | 12/2017 | |
| CN | 207634638 | U | 7/2018 | |
| CN | 108390154 | A * | 8/2018 | |
| CN | 109611515 | A * | 4/2019 | F16H 1/22 |
| CN | 110401037 | A * | 11/2019 | |
| CN | 110504545 | A * | 11/2019 | H01Q 19/104 |
| CN | 110676585 | A * | 1/2020 | H01Q 23/00 |
| CN | 112886250 | A * | 6/2021 | |
| KR | 20140084835 | | 7/2014 | |

OTHER PUBLICATIONS

Extended European Search Report of EP18821982.8 dated Jul. 29, 2021, 16 pages.
Chinese Office Action from Chinese Serial No. 201711275780.0 dated May 5, 2019, 5 pages.

* cited by examiner

MULTI-FREQUENCY ANTENNA TRANSMISSION

TECHNICAL FIELD

The present application pertains to the technical field of mobile communication antenna transmissions, and more particularly relates to a multi-frequency antenna transmission.

BACKGROUND

With the development of mobile communication technologies, large-capacity and multi-band antennas have become an important development direction of mobile communication antennas. To accommodate more antennas in a limited space, it is not possible to simply assemble a plurality of segment antennas together, which will result in bulky, heavy, and inefficient antennas.

With regard to a large-capacity and multi-frequency antenna of an existing product, a plurality of frequency bands are collectively assembled in one antenna, and a regulator of each frequency band is connected to one rack. A plurality of racks are arranged side by side on a plane, and the plurality of racks are driven to move and achieve adjustment through a common drive gear. When disposed at a different position, the common gear meshes with different racks, thus achieving the adjustment of the different racks. Since the common gear has to move to the positions of the different racks, the positions of the gear and the racks are strictly required. When the position of the common gear of the existing product moves, it is prone to jamming, which affects the timeliness and accuracy of the antenna adjustment.

TECHNICAL PROBLEM

The purpose of the present application is to provide a multi-frequency antenna transmission, so as to solve the technical problem that the existing multi-frequency antenna adopts a gear and a rack to adjust the position, which has strict requirements on the positions of the gear and the rack, and that the common gear is prone to jamming when moving.

SUMMARY

In order to achieve the above purpose, the technical solution adopted by the present application is that: a multi-frequency antenna transmission is provided, which includes:
drive gears;
a gear train with parallel gear shafts, including several transmission gears driven to rotate by the drive gear;
screw assemblies each arranged corresponding to a respective transmission gear, and wherein each of the screw assemblies includes a lead screw, a connection member selectively connected to or separated from the lead screw, a stopper connected with the corresponding transmission gear, and a first elastic member disposed between the connection member and the stopper; and
a shifter, configured to push one stopper of the stoppers, such that the corresponding first elastic member is compressed and disposed between said stopper and the corresponding connection member, and the connection member is connected to the corresponding lead screw.

BENEFICIAL EFFECTS

The transmission gears are connected to the stoppers of the screw assemblies one by one, the drive gear drives the various transmission gears to rotate, and all the stoppers rotate. The shifter pushes the stopper of one of the screw assemblies, such that the first elastic member disposed between the connection member and the stopper is compressed, and the connection member is connected to the corresponding lead screw, thus the power of the stopper is transmitted to the corresponding lead screw through the compressed first elastic member and the connection member, and drives the lead screw to rotate. When the shifter does not push the stopper, the first elastic member is elongated, and the stopper is reset to cut off the power transmission. The screw assemblies of the multi-frequency antenna transmission may be arranged on a plane, and the thickness of its structure is thin, which makes the antenna space more flat, and is more convenient for installation. The shifter determines which screw assembly needs to be adjusted, and that one driving force completes the adjustment of a plurality of screw assemblies is achieved, i.e., one drives more. The connection among the first elastic member after compression, the connection member and the lead screw transmits the rotation, so that the adjusting action is smoother and the jamming phenomenon is avoided.

DESCRIPTION OF THE DRAWINGS

In order to more clearly illustrate the technical solutions in the embodiments of the present application, the drawings used in the description of the embodiments or the prior art will be briefly described below. Obviously, the drawings in the following description are only some embodiments of the present application, and other drawings may be obtained based on these drawings for those skilled in the art without creative work.

EMBODIMENTS OF THE APPLICATION

Figure 1:
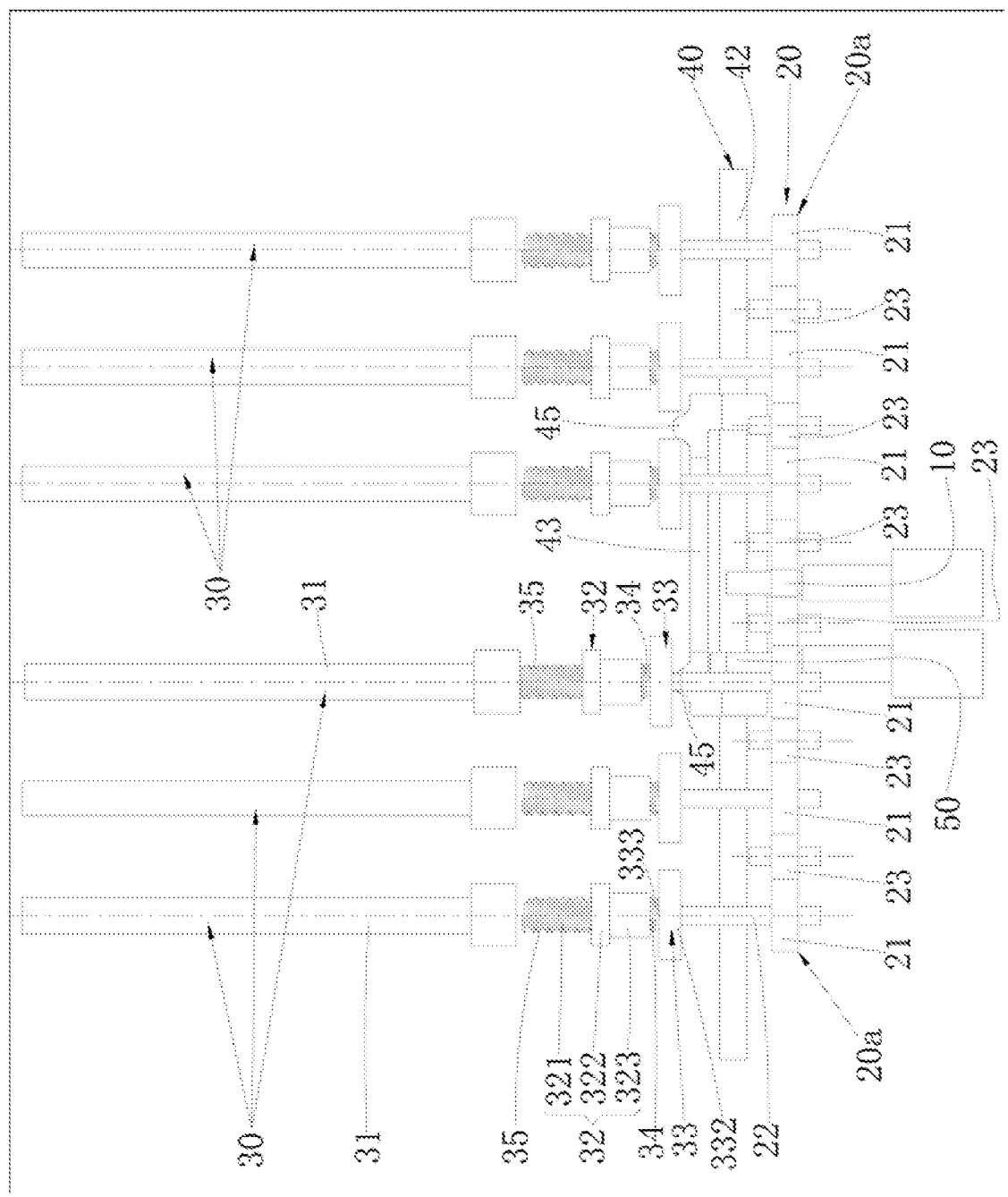
FIG. 1 is a front view of the multi-frequency antenna transmission provided by an embodiment of the present application.

In order to make the technical problem to be solved, the technical solutions and the technical effects of the present application more clear, the present application will be further described in detail below with reference to the accompanying drawings and the embodiments. It should be understood that the specific embodiments described herein are merely to illustrate the present application and are not intended to limit the present application.

It should be noted that, when an element is referred to as being "fixed" or "arranged" to another element, the element may be directly or indirectly on another element, and when an element is referred to as being "connected" to another element, the element may be directly or indirectly connected to another element.

It should be understood that, the orientation or position relationships indicated by the terms, such as "length", "width", "upper", "lower", "front", "back", "left", "right", "vertical", "horizontal", "top", "bottom", "inside", "outside" and the like, are based on the orientation or position relationships shown in the drawings, and are merely for the convenience of describing the present application and simplifying the description. These orientation or position relationships do not indicate or imply that the indicated device or element must have a particular orientation or be constructed and operated in a particular orientation, and thus are not to be construed as limiting the present application.

Moreover, the terms "first" and "second" are merely used for the purpose of description, and are not to be construed as indicating or implying a relative importance or implicitly indicating the number of specific technical features. Thus, features defined with "first" and "second" may either explicitly or implicitly include one or more of the features. In the description of the present application, "a plurality of" means two or more, unless specifically defined otherwise.

Please refer to FIGS. 1-4, a multi-frequency antenna transmission provided by the present application is described first. The multi-frequency antenna transmission includes a drive gear 10, a gear train 20 with parallel gear shafts, screw assemblies 30, and a shifter 40. The gear train 20 with parallel gear shafts includes one or more transmission gears 21 driven to rotate by the drive gear 10. The screw assemblies 30 are each arranged corresponding to a respective transmission gear 21, and each of the screw assemblies 30 include a lead screw 31, a connection member 32 selectively connected to or separated from the lead screw 31, a stopper 33 connected with corresponding transmission gear 21, and a first elastic member 34 disposed between the connection member 32 and the stopper 33. The shifter 40 is configured to push one stopper 33 of the stoppers such that the corresponding first elastic member 34 is compressed and disposed between the stopper 33 and the corresponding connection member 32, and the connection member 32 is connected to the corresponding lead screw 31.

The transmission gears 21 are connected to the stoppers 33 of the screw assemblies 30 one by one, the drive gear 10 drives the various transmission gears 21 to rotate, and all the stoppers 33 rotate. The shifter 40 pushes the stopper 33 of one of the screw assemblies 30, such that the first elastic member 34 disposed between the connection member 32 and the stopper 33 is compressed, and the connection member 32 is connected to the corresponding lead screw 31, thus the power of the stopper 33 is transmitted to the corresponding lead screw 31 through the compressed first elastic member 34 and the connection member 32, and drives the lead screw 31 to rotate. When the shifter 40 does not push the stopper 33, the first elastic member 34 is elongated, and the stopper 33 is reset to cut off the power transmission. The screw assemblies 30 of the multi-frequency antenna transmission may be arranged on a plane, and the thickness of its structure is thin, which makes the antenna space more flat, and is more convenient for installation. The shifter 40 determines which screw assembly 30 needs to be adjusted, and that one driving force completes the adjustment of a plurality of screw assemblies 30 is achieved, i.e., one drives more. The connection among the first elastic member 34 after compression, the connection member 32 and the lead screw 31 transmits the rotation, so that the adjusting action is smoother and the jamming phenomenon is avoided.

The plurality of screw assemblies 30 are arranged on the same plane side by side, and are arranged symmetrically on the left and right sides. This structure is compact and easy to assemble.

Each of the screw assemblies 30 is connected to certain drive gear 21 of the gear train at the position of the stopper 33. Each of the transmission gears 21 is opposite to the corresponding screw assembly 30, and the axes of which coincide. The lead screw 31, the connection member 32, the stopper 33 and the first elastic member 34 of the same screw assembly 30 are on the same axis. The lead screw 31 is disposed coaxially with the connection member 32, and the end of the lead screw 31 is selectively connected to or separated from the connection member 32 in the axial direction. The axis of each of the transmission gears 21 is parallel to the axis of the lead screw 31, and the positions of the various transmission gears 21 are fixed and are only pivoted about themselves. The axial position of the drive gear 10 is fixed.

The stopper 33 of the screw assembly 30 is connected to the transmission gear 21 of the gear train 20 with parallel gear shafts, and the stopper 33 is mounted with the first elastic member 34, and the other end of the first elastic member 34 is connected to the end surface of the connection member 32. The first set of screw assembly 30, from the left in FIG. 1, is in a normal state. In the normal state, the first elastic member 34 is not significantly compressed, and the connection member 32 is separated from the lead screw 31. The normal state refers to when the shifter is not in contact with the stopper 33.

When the shifter 40 pushes the stopper 33 of certain screw assembly 30, for example the stopper 33 of the third set of screw assembly 30 from the left side of FIG. 1 is pushed by the shifter 40, the stopper 33 is pushed toward one side of the lead screw 31, the first elastic member 34 is compressed, and the connection member 32 is also pushed toward one side of the lead screw 31, such that the connection member 32 and the lead screw 31 are connected. At this time, the drive gear 10 rotates to drive all the gears of all the gear train 20 with parallel gear shafts to rotate simultaneously, and only the connection member 32, corresponding to the stopper 33 pushed by the shifter 40, rotates. The power of the stopper 33 is transmitted to the corresponding lead screw 31 through the compressed first elastic member 34 and the corresponding connection member 32, so as to drive the lead screw 31 to rotate, and other screw assemblies 30 are not affected. Finally the lead screw 31 drives the regulator to complete the adjustment action. When it is necessary to adjust the other screw assemblies 30, the shifter 40 pushes the other stoppers 33 to bring the corresponding lead screws 31 into a connected state. At this time, the rotation of the drive gear 10 will drive the other screw assemblies 30 to adjust.

The drive gear 10, the gear train 20 with parallel gear shafts and the screw assemblies 30 are amounted on a frame (not shown). In screw assemblies 30, the lead screws 31 are axially fixed and may be merely pivoted about it. Both the connection members 32 and the stoppers 33 may move in a predetermined range along the axial direction of the lead screws 31, and when the stoppers 33 is close to the connection members 32, the first elastic members 34 are compressed, and the power of the stoppers 33 is transmitted to the connection members 32 through the first elastic members 34.

Further, as a specific embodiment of the multi-frequency antenna transmission provided by the present application, each of the screw assemblies 30 further includes a second elastic member 35 connected to a side of the connection member 32 facing away from the first elastic member 34, and the second elastic member 35 is away from the end of the connection member 32 and faces toward the end of the lead screw 31, and the second elastic member 35 is compressed and disposed between the connection member 32 and the lead screw 31 when the connection member 32 is connected with the lead screw 31. The second elastic member 35 is not in contact with the screw shaft 31 in the normal state. When the shifter 40 pushes the stopper 33 of certain screw assembly 30, for example the stopper 33 of the third set of screw assembly 30 from the left side of FIG. 1 is pushed by the shifter 40, the stopper 33 is pushed toward one side of the lead screw 31, the first elastic member 34 is compressed, and the connection member 32 is also pushed toward one side of the lead screw 31, such that the connection member 32 and the lead screw 31 are connected, and the second elastic member 35 is in contact with the connection member 32 and the lead screw 31 simultaneously. At this time, the drive gear 10 rotates to drive all the gears of all the gear train 20 with parallel gear shafts to rotate simultaneously, and merely the connection member 32, corresponding to the stopper 33 pushed by the shifter 40, rotates, and the connection member 32 drives the lead screw 31 to rotate through the connection between the connection member 32 and the lead screw 31, and the second elastic member 35. The power of the stopper 33 is transmitted to the lead screw 31 through the compressed first elastic member 34, the connection member 32 and the second elastic member 35, and drives the lead screw 31 to rotate, and the other screw assemblies 30 are not affected. The second elastic member 35 ensures timely transmission of rotation when the connection member 32 and the lead screw 31 are not reliably connected. When the shifter 40 does not push the stopper 33, the compressed second elastic member 35 is elongated, connection member 32 is pushed to move toward the stopper 33, and the connection member 32 is separated from the end of the lead screw to achieve the reset.

Further, as a specific embodiment of the multi-frequency antenna transmission provided by the present application, the lead screw 31 and the connection member 32 are selectively connected or separated by a coupling. The coupling may transmit the rotation of the connection member 32 to the lead screw 31. In the normal state, the connection member 32 is not in contact with the lead screw 31, for example the first set of lead screw assembly 30 is in the normal state as shown from the left side of FIG. 1. When the shifter 40 pushes the stopper 33 of certain screw assembly 30, for example, the stopper 33 of the third set of screw assembly 30 from the left side of FIG. 1 is pushed by the shifter 40, the stopper 33 is pushed toward one side of the lead screw 31, the first elastic member 34 is compressed, and the connection member 32 is also pushed toward one side of the lead screw 31, such that the coupling between the connection member 32 and the lead screw 31 is in a connected state, and the power of the stopper 33 is transmitted to corresponding lead screw 31 through the compressed first elastic member 34 and the coupling, and drives the lead screw 31 to rotate.

Figure 4:
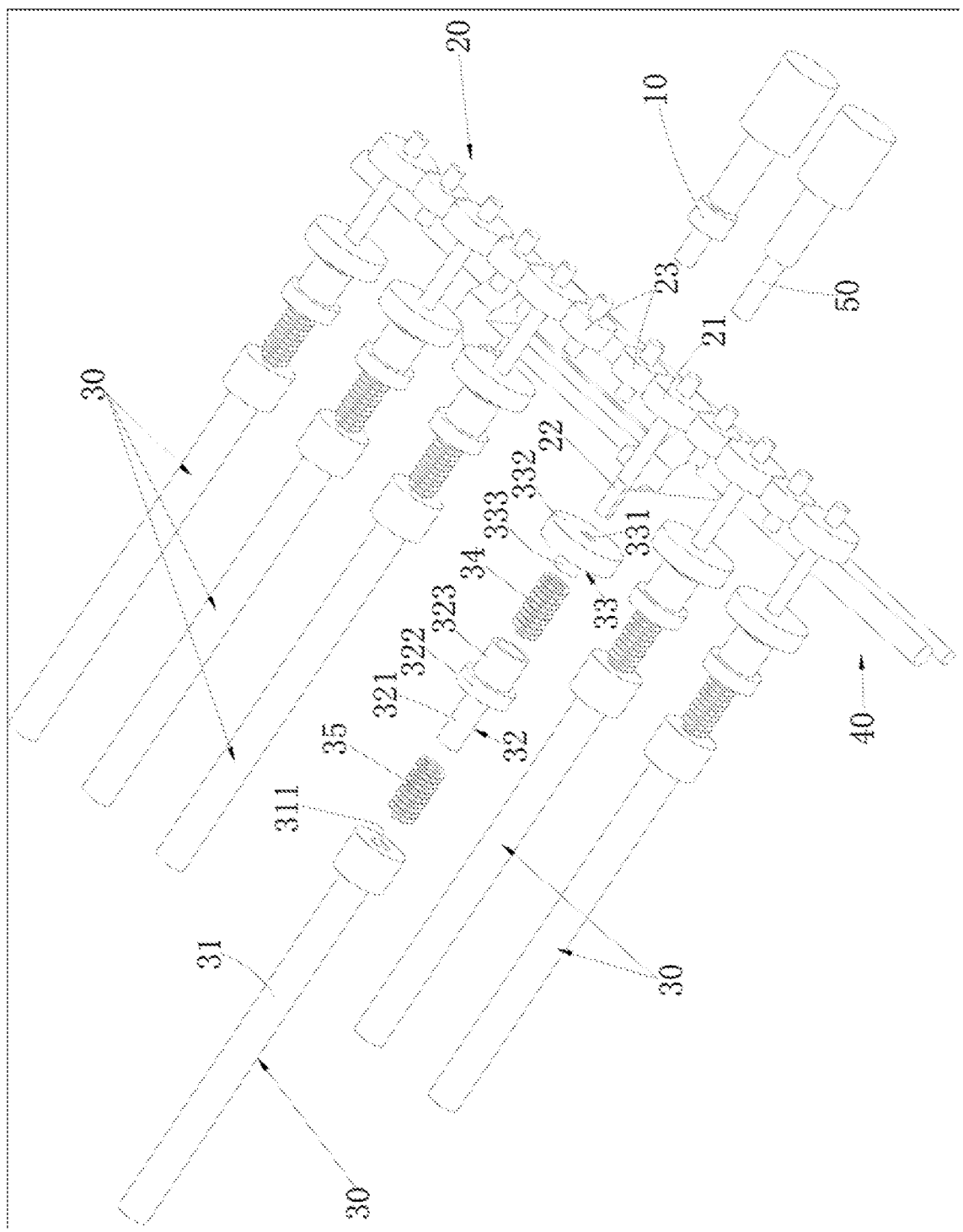
FIG. 4 is an exploded perspective view of the multi-frequency antenna transmission in FIG. 2.

Further, please refer to FIG. 4, as a specific embodiment of the multi-frequency antenna transmission provided by the present application, one end of the lead screw 31 is provided with a hole 311, and one side of the connection member 32 is provided with a insertion shaft 321 for inserting and engaging with the hole 311. The hole 311 may be a regular polygonal hole or a D-shaped hole or other type of hole, and accordingly, the insertion shaft 321 is a insertion shaft 321 having an adaptive shape. Alternatively, one end of the lead screw 31 is provided with a spline groove, and one side of the connection member 32 is provided with a spline shaft for inserting and engaging with the spline groove, which may be selected as needed. The connection state is achieved when the shaft is inserted into the hole or the groove, and the separation state is achieved when the shaft is taken out of the hole or the groove.

Further, as a specific embodiment of the multi-frequency antenna transmission device provided by the present application, the transmission gear 21 is fixedly connected with the connecting shaft 22, the stopper 33 is slidably connected to the connecting shaft 22 along the axial direction of the corresponding transmission gear 21, and the transmission gear 21 and the stopper 33 are connected and synchronously rotate through the connecting shaft 22. This solution is easy to machine and assemble. The stopper 33 is provided with a connecting hole 331, and the cross section of the connecting hole 331 is adapted to the cross section of the connecting shaft 22, and when the connecting shaft 22 is inserted through the connecting hole 331, the stopper 33 follows to rotate when the connecting shaft 22 rotates, and the stopper 33 may slide on the connecting shaft 22 along the axial direction of the connecting shaft 22. When the shifter 40 pushes the stopper 33 of certain screw assembly 30, for example, the stopper 33 of the third set of screw assembly 30 from the left side of FIG. 1 is pushed by the shifter 40, the stopper 33 may be pushed toward one side of the lead screw 31 along the connecting shaft 22, such that the first elastic member 34 disposed between the connection member 32 and the stopper 33 is compressed, and the connection member 32 is connected to the corresponding lead screw 31, thus the power of the stopper 33 is transmitted to the corresponding lead screw 31 through the compressed first elastic member 34 and the connection member 32, and drives the lead screw 31 to rotate. When the shifter 40 does not push the stopper 33, the first elastic member 34 is elongated, and the stopper 33 is reset along the axial direction of the connecting shaft 22 to cut off the power transmission.

Figure 2:
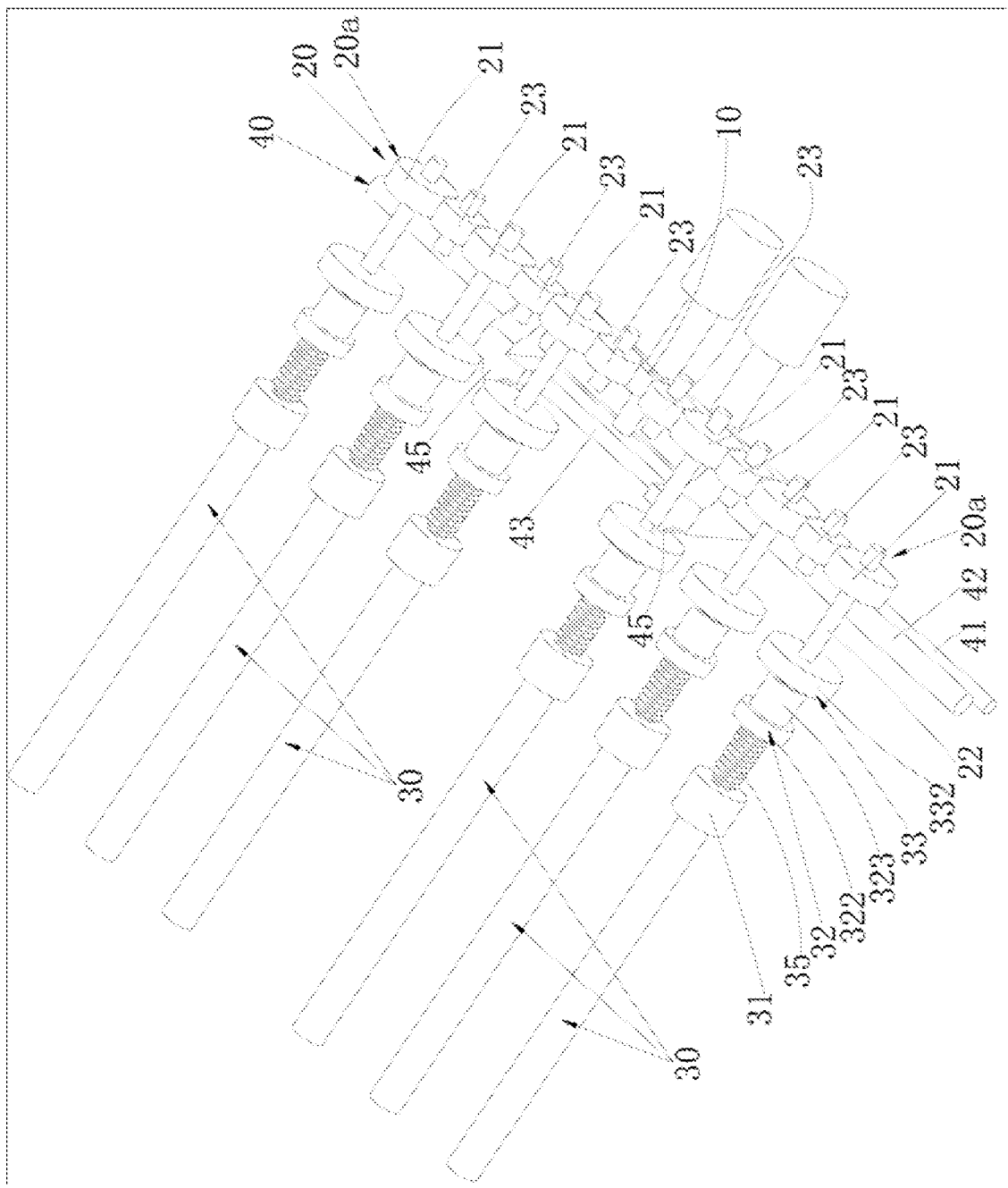
FIG. 2 is a perspective assembled view of the multi-frequency antenna transmission in FIG. 1.
Figure 3:
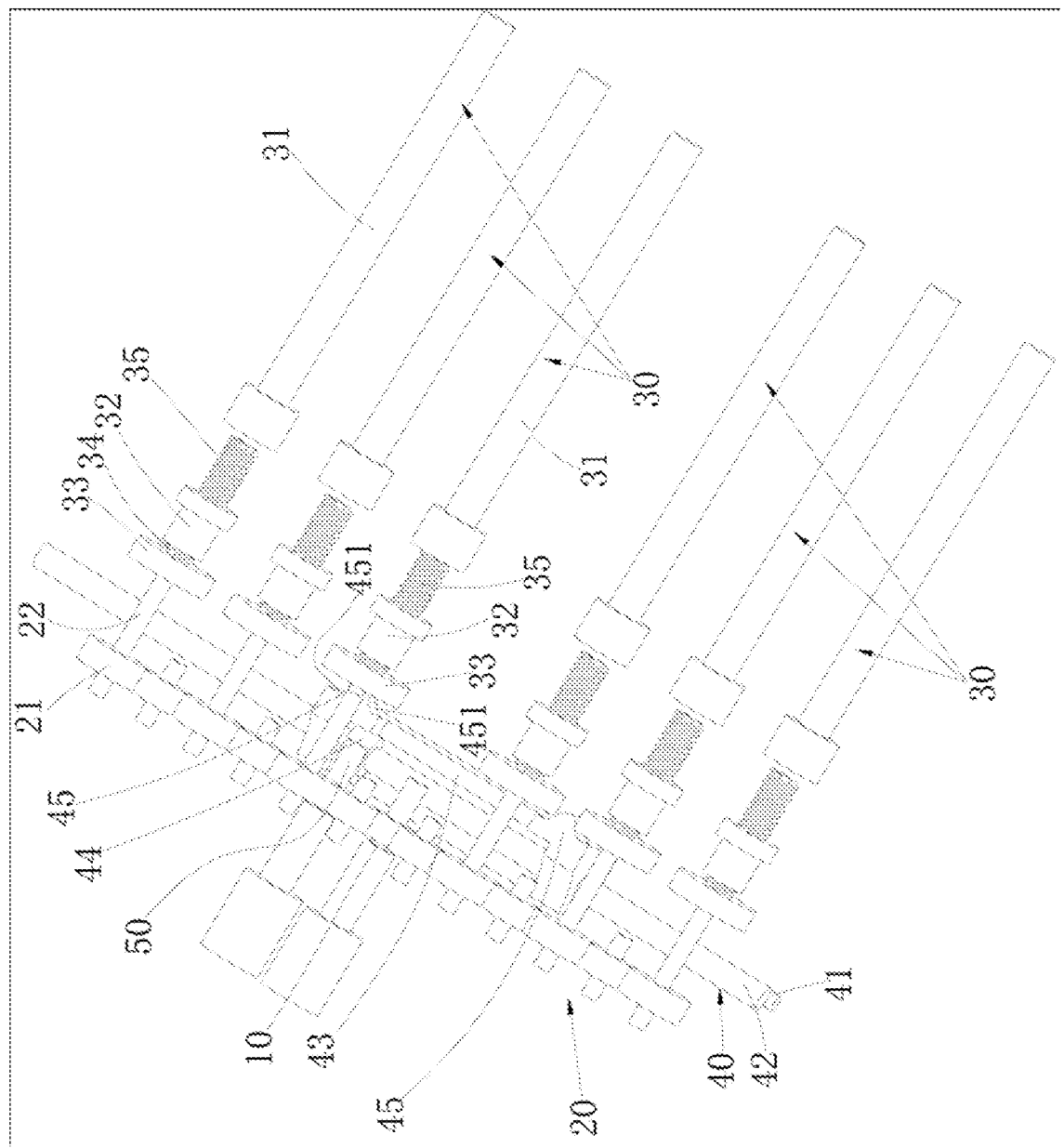
FIG. 3 is a perspective assembled view of the multi-frequency antenna transmission in FIG. 2 from another angle.

Further, please refer to FIG. 2 and FIG. 3, as a specific embodiment of the multi-frequency antenna transmission provided by the present application, the shifter 40 includes a guide rail 41, a guide rod 42 disposed in parallel with the guide rail 41, a holder 43 slidably mounted on the guide rail 41 and driven with the guide rod 42 through a thread, and a face gear 44 mounted on the guide rod 42. The face gear 44 is meshed with an input gear 50, and the axis of the input gear 50 is perpendicular to the axis of the guide rod 42. The holder 43 is convexly provided with a protrusion 45 for pushing one of the stoppers 33. The guide rail 41 and the guide rod 42 are mounted on a mounting plate (not shown), and both are mounted in parallel. The guide rod 42 is mounted with the face gear 44, and the face gear 44 meshes with the input gear 50 to convert the rotation of the input gear 50 into the rotation of the face gear 44. The rotation axis of the face gear 44 is coaxial with the guide rod 42, and is vertical to the rotation axis of the input gear 50. After the face gear 44 rotates, the guide rod 42 is driven to rotate, and the holder 43 is mounted on the guide rail 41 and the holder 43, and when the guide rod 42 rotates, the holder 43 is driven to move left and right. The input gear 50 is connected to the shifter to drive the shifter to switch position. When other screw assemblies 30 needs to be adjusted, the input gear 50 rotates to drive the face gear 44 to rotate, and the face gear 44 drives the guide rod 42 to rotate, and the guide rod 42 drives the holder 43 to move to the position of the next screw assembly 30, and then the input gear 50 stops rotating. At this time, the rotation of the drive gear 10 will drive another screw assembly 30 to adjust. The shifter 40 realizes the movement transmission of the vertical axis between the input gear 50 and the guide rod 42 through the face gear 44, and the transmission efficiency is high. The axial runout of the input gear 50 does not affect the center distance of the input gear 50 and the face gear 44, so that the input gear 50 is more convenient to mount. The axis of the input gear 50 is parallel and close to the axis of the drive gear 10, and this structure is compact and is easy to assemble the drive member. Both ends of the protrusion 45 are provided with a guiding smooth surface 451 to facilitate the movement of the stopper 33 to the highest position of the protrusion 45.

Further, as a specific embodiment of the multi-frequency antenna transmission provided by the present application, the number of the protrusions 45 is two, wherein when one of the protrusions 45 pushes one of the stoppers 33, the other of the protrusions 45 is disposed between the other two stoppers 33. The side of the holder 43 facing toward the screw assembly 30 has two protrusions 45, and the protrusions 45 may withstand the end face of the stopper 33. The distance between the two protrusions 45 is proportional to the distance of the two screw assemblies 30, such that when one of the protrusions 45 contacts the stopper 33, the other protrusion 45 is disposed between the two lead screws 31, i.e., at the same time, merely one protrusion 45 is in contact with one lead screw 31. When the drive gear 10 drives the transmission gear 21 of the gear train 20 with parallel gear shafts to rotate, the transmission gears 21 respectively drives the corresponding stoppers 33 to rotate, and merely the connection member 32 corresponding to the stopper 33 pushed by the protrusion 45 rotates, and other screw assemblies 30 are unaffected.

Further, please refer to FIG. 1 and FIG. 2, as a specific embodiment of the multi-frequency antenna transmission provided by the present application, the gear train 20 with parallel gear shafts further includes idler gears 23, the amount of which is equal to the amount of the transmission gears 21, and the transmission gears 21 close to the drive gear 10 are connected to the transmission gears 21 through one idle gear 23, and every adjacent two of the transmission gears 21 are connected through one idle gear 23. When the drive gear 10 rotates, the idle gears 23 are engaged, so that the respective transmission gears 21 rotate simultaneously, and the rotation direction of the transmission gears 21 is the same as the rotation direction of the drive gear 10. The gear train 20 with parallel gear shafts is driven based on an involute gear, which has low friction and high transmission efficiency.

Further, as a specific embodiment of the multi-frequency antenna transmission provided by the present application, the drive gear 10 is connected with two gear transmission groups 20a, and the idle gears 23 and the transmission gears 21 are arranged sequentially alternated to form one gear transmission group 20a, and all the axes of the idler gears 23 are in the same plane with the axes of the transmission gears 21. The gears of the gear train 20 with parallel gear shafts are arranged in bilateral symmetry. The drive gear 10 is disposed on the center line of the bilateral symmetry, and meshes with the idle gears 23 on the left and right sides, the idle gear 23 meshes with the transmission gear 21 of the gear train, and the transmission gear 21 meshes with the next idle gear 23, which are arranged sequentially alternated. The axes of the various gears are parallel to the axes of the lead screws 31, and the various gears are axially fixed and may be merely pivoted about themselves.

Further, please refer to FIG. 1 and FIG. 4, as a specific embodiment of the multi-frequency antenna transmission provided by the present application, the connection member 32 includes a body portion 322 and a cylindrical portion 323 disposed on one side of the body portion 322. The stopper 33 includes a plate body 332, and a limiting segment 333 formed by extending from one side of the plate body 332 facing toward the connection member 32. One end of the first elastic member 34 is inserted into the cylindrical portion 323 and abuts against the body portion 322, and the other end of the first elastic member 34 is sleeved outside the limiting segment 333 and abuts against the plate body 332. This solution facilitates the assembling of the first elastic member 34. The limiting segment 333 is aligned with the cylindrical portion 323, and when the stopper 33 is close to the connection member 32, the first elastic member 34 is compressed, and the power of the stopper 33 is transmitted to the connection member 32 through the first elastic member 34, thus the operation is reliable.

The above description is merely preferred embodiments of the present application, and is not intended to limit the present application. Any modifications, equivalent substitutions and improvements made within the spirit and principles of the present application should be included in the scope of the present application.

What is claimed is:

1. A multi-frequency antenna transmission, comprising:
   drive gear;
   a gear train with parallel gear shafts, comprising several transmission gears driven to rotate by the drive gear;
   screw assemblies each arranged corresponding to a respective transmission gear, wherein each of the screw assemblies comprises a lead screw, a connection member selectively connected to or separated from the lead screw, a stopper connected with the corresponding transmission gear, and a first elastic member disposed between the connection member and the stopper; and
   a shifter, configured to push one of the stoppers, such that the corresponding first elastic member is compressed and disposed between said stopper and the corresponding connection member, and the connection member is connected to the corresponding lead screw.

2. The multi-frequency antenna transmission according to claim 1, wherein each of the screw assemblies further includes a second elastic member connected to one side of the connection member facing away from the first elastic member, and the second elastic member is away from the end of the connection member and faces toward the end of the lead screw, and the second elastic member is compressed and disposed between the connection member and the lead screw when the connection member is connected with the lead screw.

3. The multi-frequency antenna transmission according to claim 1, wherein the lead screws and the connection members are selectively connected or separated through a coupling.

4. The multi-frequency antenna transmission according to claim 3, wherein one end of the lead screw is provided with a hole, and one side of the connection member is provided with an insertion shaft for inserting and engaging with the hole;
   alternatively, one end of the lead screw is provided with a spline groove, and one side of the connection member is provided with a spline shaft for inserting and engaging with the spline groove.

5. The multi-frequency antenna transmission according to claim 1, wherein the transmission gears are respectively fixedly connected with connecting shafts, the stoppers are slidably connected to the connecting shafts respectively along the axial direction of the corresponding transmission gears, and the transmission gears and the stoppers are respectively connected and synchronously rotate through the connecting shafts.

6. The multi-frequency antenna transmission according to claim 1, wherein the shifter comprises a guide rail, a guide rod disposed in parallel with the guide rail, a holder slidably mounted on the guide rail and driven with the guide rod through a thread, and a face gear mounted on the guide rod; the face gear is meshed with an input gear, and the axis of the input gear is perpendicular to the axis of the guide rod, and the holder is convexly provided with a protrusion for pushing one of the stoppers.

7. The multi-frequency antenna transmission according to claim 6, wherein the amount of the protrusions is two, and when one of the protrusions pushes one of the stoppers, the other protrusion is disposed between other two stoppers.

8. The multi-frequency antenna transmission according to claim 1, wherein the gear train with parallel gear shafts further comprises idler gears, the amount of the idler gears is equal to the amount of the transmission gears, and the transmission gears close to the drive gear are respectively connected to the drive gear through one of the idle gears, and each adjacent two of the transmission gears are connected with each other through one of the idle gears.

9. The multi-frequency antenna transmission according to claim 8, wherein the drive gear is connected with two gear transmission groups, and the idle gears and the transmission gears are arranged sequentially alternated to form one of the gear transmission groups, and all the axes of the idler gears are in the same plane with the axes of the transmission gears.

10. The multi-frequency antenna transmission according to claim 1, wherein the connection members respectively comprises a body portion, and a cylindrical portion disposed on one side of the body portion; the stoppers respectively comprises a plate body, and a limiting segment formed by extending from one side of the plate body facing toward corresponding connection member; one end of the first elastic member is inserted into the cylindrical portion and abuts against the body portion, and the other end of the first elastic member is sleeved outside the limiting segment and abuts against the plate body.

11. The multi-frequency antenna transmission according to claim 1, wherein, in each of the screw assemblies, the lead screw and the connection member are coaxially arranged.

12. The multi-frequency antenna transmission according to claim 5, wherein the stoppers are respectively provided with a connecting hole, and the cross section of the connecting hole is adapted to the cross section of corresponding connecting shaft.

\* \* \* \* \*